UNITED STATES PATENT OFFICE.

WILLIAM M. NIX, OF FULTON, KENTUCKY.

MATCH.

SPECIFICATION forming part of Letters Patent No. 436,877, dated September 23, 1890.

Application filed April 10, 1890. Serial No. 347,387. (No specimens.)

*To all whom it may concern:*

Be it known that I, WILLIAM M. NIX, of Fulton, in the county of Fulton, State of Kentucky, have invented a certain new and useful Improvement in the Manufacture of Friction-Matches, of which the following is a specification.

This invention relates to the manufacture of friction-matches, or what are termed "safety-matches."

The object of the invention is to produce safety-matches which shall be water-proof and readily lighted in wet weather or damp climates.

A further object of the invention is the prevention of the glowing of the splint after the match has been extinguished, and the scattering of live coals from the same cause when the extinguished match is thrown aside.

A further object of the invention is the production of a match-head which does not scatter itself about on scraping and ignition.

To accomplish these results I employ the following ingredients, and in the manner which will be hereinafter described.

The composition used upon the improved safety-match consists of the following ingredients, used in the following proportions, viz: glue, six hundred and seventy parts; hard or soft paraffine, two hundred and fifty parts; chlorate of potassium, two thousand parts; peroxide of lead, or bioxide of lead, or puce-colored oxide of lead, eleven hundred and fifty parts; native sulphide of antimony, twelve hundred and fifty parts; bichromate of potash, thirteen hundred and eighteen parts; Prussian blue, two thousand five hundred parts, and a sufficient quantity of water; or, the bichromate of potash may be omitted where a water-proof match is not desired, and one thousand additional parts of peroxide of lead added. These materials must be combined with great care and intimacy after the following manner: The glue is soaked in water for several hours and until thoroughly swollen. It is then melted at a gentle heat over a water bath with sufficient water to give the proper consistency to it. When cool, the chlorate is added in fine powder, and gradually the other materials, thus forming a sirupy mass. The sirupy mass is then manipulated until it is homogeneous and the ingredients intimately mixed. Into this preparation the splint is dipped, and then dried in any suitable manner. I prefer to dry the splints by artificial heat. For the production of the water-proof match-head these operations must all be conducted in the dark after the addition of the bichromate of potash, upon the well-known principle of the rendering insoluble of glue by light in the presence of bichromate of potash.

These matches are ignited by scraping on the well-known surface prepared with amorphous phosphorus, &c.

For the production of the non-glowing splint a solution of commercial phosphate of soda is used for a dipping-bath for the splints before dipping them in the paraffine bath in the usual way. The strength of this solution may vary within wide limits without injuring its efficiency.

Matches thus made are water-proof and not affected by wet or damp weather. The heads do not come off even after long soaking in water, nor disintegrate under such condition like ordinary matches. No unpleasant gases are generated by my improved composition, and the process can be carried out without changing of existing plant, and the artificial drying-chambers may be omitted, since the material I use dries quickly in any ordinary temperature, thereby enabling the matches to be manufactured, packed, and delivered in a few hours. I can use any kind of wood for the match-splints.

There is no cracking or other unpleasant noise made when lighting matches made in accordance with my invention.

I propose to dip both ends of the splint in the manufacture of the matches, thus producing a double-headed match.

Inasmuch as I propose to manufacture matches having two heads—one at each end of the splint—it is very important that the splint be so treated as to render the uncovered portion thereof non-glowing, because if such were not the case the head at the other end of the splint would probably become ignited by the glowing of the match-splint, if carelessly thrown aside before being put out or extinguished.

Having described my invention and the best way now known to me of carrying the same into effect, what I claim, and desire to secure by Letters Patent, is—

1. A double-headed water-proof match having its heads composed of glue or other gelatinous binding material, paraffine, chlorate of potassium, peroxide of lead, sulphide of antimony, combined with bichromate of potash in the absence of light as to make the match-head impervious to water, as set forth.

2. A double-headed damp or water proof match which will not carbonize when extinguished, having its heads composed of glue or other gelatinous binding material, paraffine, chlorate of potassium, peroxide of lead, sulphide of antimony, bichromate of potash, (added in the absence of light,) and Prussian blue or other coloring-matter.

3. A match-splint previously soaked in a bath of phosphate of soda, and having its two heads composed of glue or other gelatinous binding material, paraffine, chlorate of potassium, peroxide of lead, and sulphide of antimony, in the proportion above stated.

4. A match-splint previously soaked in a bath of phosphate of soda, and having its heads composed of glue or other gelatinous binding material, paraffine, chlorate of potassium, peroxide of lead, sulphide of antimony, and bichromate of potash, in the proportions above stated.

In testimony whereof I have hereunto set my hand this 10th day of April, 1890.

WILLIAM M. NIX.

Witnesses:
EWELL A. DICK,
W. H. SHIPLEY.